(12) United States Patent
Brickner

(10) Patent No.: US 12,244,431 B2
(45) Date of Patent: Mar. 4, 2025

(54) SYSTEMS AND METHODS FOR PROVIDING LIVE ONLINE FOCUS GROUP DATA

(71) Applicant: Mercury Analytics, LLC, Washington, DC (US)

(72) Inventor: Scott Brickner, Washington, DC (US)

(73) Assignee: Mercury Analytics, LLC, Washington, DC (US)

( * ) Notice: Subject to any disclaimer, the term of this patent is extended or adjusted under 35 U.S.C. 154(b) by 0 days.

(21) Appl. No.: 18/108,889

(22) Filed: Feb. 13, 2023

(65) Prior Publication Data

US 2023/0188373 A1 Jun. 15, 2023

Related U.S. Application Data

(63) Continuation of application No. 17/197,731, filed on Mar. 10, 2021, now Pat. No. 11,582,051.

(51) Int. Cl.
| | | |
|---|---|---|
| *H04L 12/18* | (2006.01) | |
| *G06F 16/9035* | (2019.01) | |
| *G06Q 30/0203* | (2023.01) | |
| *H04L 65/1093* | (2022.01) | |
| *H04L 65/401* | (2022.01) | |

(52) U.S. Cl.
CPC ...... *H04L 12/1822* (2013.01); *G06F 16/9035* (2019.01); *G06Q 30/0203* (2013.01); *H04L 65/1093* (2013.01); *H04L 65/4015* (2013.01)

(58) Field of Classification Search
CPC .............. H04L 12/1822; H04L 65/1093; H04L 65/4015; G06F 16/9035; G06Q 30/0203
See application file for complete search history.

(56) References Cited

U.S. PATENT DOCUMENTS

| | | |
|---|---|---|
| 10,250,851 B1 | 4/2019 | Harpur |
| 2011/0135082 A1 | 6/2011 | Lingafelt |
| 2011/0270663 A1 | 11/2011 | Jones |
| 2016/0057386 A1 | 11/2016 | Wrench |
| 2017/0302795 A1 | 10/2017 | Wolzien |
| 2020/0021453 A1 | 1/2020 | Advani |
| 2020/0219216 A1* | 7/2020 | Davis ................... H04L 12/1822 |
| 2020/0389506 A1 | 12/2020 | Rakshit |

* cited by examiner

*Primary Examiner* — Raqiul A Choudhury

(57) ABSTRACT

A method includes receiving a selection of a subgroup of participants from a group of potential focus group participants, placing each participant in the subgroup of participants in a waiting room environment, establishing a respective testing video conference between each participant in the subgroup of participants and the second user and confirming, based on the respective testing video conference, a respective technical ability to carry out a video conference. The method includes establishing the video conference comprising each respective confirmed participant and the second user, receiving respective data as part of the focus group from each respective confirmed participant and presenting live data associated with the video conference of the focus group to the first user at a user device. The method and associated network server enable a quick way to establish a focus group and then carry out a focus group on a topic of interest.

18 Claims, 8 Drawing Sheets

Focus Group Monitor 1.1

| Gender | 202 212 204 | Age | 214 | Ethnicity | 206 Prequalified 216 | Education | 208 | HHI | 218 210 |
|---|---|---|---|---|---|---|---|---|---|
| Male | 6 3 7 | 21-24 | 1 1 1 | Caucasian | 3 2 6 | Some High | 0 0 2 | Under $50,000 | |
| Female | 2 1 2 | 25-29 | 1 1 1 | African American | 1 0 1 | High School | 2 0 1 | $50,000 to less than $75,000 | |
| | | 30-34 | 6 1 5 | Hispanic | 0 0 2 | Some College | 1 0 1 | $75,000 to less than $100,000 | |
| | | 35-39 | 0 0 1 | Other | 4 2 0 | College | 4 1 4 | $100,000 to less than $150,000 | |
| | | 40-44 | 0 1 0 | | | Post Grad | 1 3 1 | $150,000 to less than $200,000 | |
| | | 45-49 | 0 0 1 | | | | | $200,000 to less than $250,000 | |
| | | 55-59 | 0 0 1 | | | | | $250,000 or more | |
| Male | | 30-34 | | Caucasian | | College | | $50,000 to less than $75,000 | |
| Male | | 40-44 | | Other | | Post Grad | | $100,000 to less than $150,000 | |
| Female | | 25-29 | | Other | | Some College | | $150,000 to less than $200,000 | |

FIG. 2

Focus Group Monitor 1.1

| | | | Prequalified | | | Qualified | | | | Rejected | |
|---|---|---|---|---|---|---|---|---|---|---|---|
| Time | | First Name | Last Name | Gender | Age | Ethnicity | Education | HHI | Mens Majors | PGA Tour | ACTIONS | Email |
| 4:15 | + | | | Male | 30-34 | Caucasian | College | $50,000 to less than $75,000 | Somewhat | Somewhat | Played. Attended | |
| 4:15 | + | | | Male | 40-44 | Other | Post Grad | $100,000 to less than $150,000 | Somewhat | Somewhat | Subscription. PPV | |
| 4:15 | + | | | Female | 25-29 | Other | Some College | $150,000 to less than $200,000 | Very | Very | Played. Subscription | |
| 4:00 | + | | | Female | 30-34 | Caucasian | College | Under $50,000 | Very | Very | Played. PPV. Regularly watched | |
| 4:00 | + | | | Male | 21-24 | Caucasian | Post Grad | $75,000 to less than $100,000 | Very | Very | Played. PPV. Regularly watched | |
| 4:00 | + | | | Male | 21-24 | Caucasian | College | $50,000 to less than $75,000 | Somewhat | Somewhat | Played. Attended | |
| 4:00 | + | | | Male | 30-34 | Other | Post Grad | $75,000 to less than $100,000 | Very | Very | Played. Subscription | |
| 4:00 | + | | | Male | 25-29 | Other | Post Grad | $100,000 to less than $150,000 | Very | Very | Played. Subscription | |
| 2:30 | + | | | Male | 30-34 | Hispanic | College | $100,000 to less than $150,000 | Very | Very | Played. Subscription. Regularly watched | |
| 3:30 | + | | | Female | 30-34 | Caucasian | College | $50,000 to less than $75,000 | Somewhat | Somewhat | Played. Subscription | |
| 2:00 | + | | | Male | 30-34 | Other | College | under $50,000 | Very | Very | Played. Subscription | |
| 1:45 | + | | | Male | 30-34 | Other | High School | $75,000 to less than $100,000 | Somewhat | Somewhat | Played. Subscription | |
| 1:00 | + | | | Male | 30-34 | African American | High School | $150,000 to less than $200,000 | Very | Very | Played. Subscription | |

FIG. 3

Focus Group Monitor 1.1

| | | Prequalified | | | | | | Qualified | | | | Rejected | |
|---|---|---|---|---|---|---|---|---|---|---|---|---|---|
| Time | ≡ | First Name | Last Name | Gender | Age | Ethnicity | Education | HHI | Mens Majors | PGA Tour | ACTIONS | Email | |
| ++++ | × | Andrew | Garcia | Male | 45-49 | Hispanic | Some High | $100,000 to less than $150,000 | Very | Somewhat | Played. Subscription | andrewjg94@gmail.com | |
| ++++ | × | Arshwarya | Pawar | Female | 30-34 | Other | College | $200,000 to less than $250,00 | Very | Very | Played. Subscription | arshwaryapawar@gwu.edu | |
| ++++ | × | Jason | Pratt | Male | 21-24 | Caucasian | College | $50,000 to less than $75,000 | Somewhat | Very | Played. Subscription | jasonp@mercuryanalyticss.com | |
| 1:15 | × | Narender | Baberwal | Male | 40-44 | Other | Post Grad | $100,000 to less than $150,000 | Very | Somewhat | Subscription. PPV | narenderb@mercuryanalytics.com | |
| 1:15 | × | Andrew | Garcia | Male | 21-24 | Caucasian | Post Grad | $75,000 to less than $100,000 | Very | Very | Played. PPV. Regularly watched | andrewjg94@gmail.com | |
| 1:15 | × | Prasad | Dugad | Male | 25-29 | Other | Post Grad | $100,000 to less than $150,000 | Very | Very | Played. Subscription | prasaddugad@gmail.com | |
| 1:15 | × | Jordan | Kraft | Female | 30-34 | Caucasian | College | $50,000 to less than $75,000 | Somewhat | Somewhat | Played. Subscription | jordank@mercuryanalytics.com | |
| ++++ | × | Cowes | Gather | Male | 30-34 | Caucasian | College | $75,000 to less than $100,000 | Very | Very | Subscription. PPV | cowesg@mercuryanalyticss.com | |
| ++++ | × | Narender | Baberwal | Male | 30-34 | Hispanic | College | $150,000 to less than $200,000 | Somewhat | Somewhat | Played. Regularly watched | narenderb@mercuryanalyticss.com | |
| ++++ | × | Praneet | Pant | Male | 30-34 | Caucasian | Some High | $75,000 to less than $100,000 | Very | Somewhat | Played. Subscription | praneetp@mercuryanalytics.com | |

FIG. 4

SYSTEMS AND METHODS FOR PROVIDING LIVE ONLINE FOCUS GROUP DATA

PRIORITY INFORMATION

The present application is a continuation of U.S. patent application Ser. No. 17/197,731, filed Mar. 10, 2021, the contents of which is incorporated herein by reference in its entirety.

TECHNICAL FIELD

The present disclosure generally relates to focus groups and introduces a new technology that enables the ability to provide live on-line focus groups that are quickly established and executed after a request by a client for the focus group.

INTRODUCTION

Focus groups provide valuable research on human subjects. A focus group consists of a group of people typically having a particular set of characteristics. Members of the focus group are asked to provide input in response to questions, videos, commercials, advertisements or other data. A company may use a focus group to gather customer feedback on a new product or service before they decide to take the concept into development. Focus groups are used to increase knowledge in fields such as social research, marketing, demography and politics.

Focus group research is often used to assess thoughts, opinions, and feelings. Typically, establishing a focus group requires members of the group to come to a facility or to gather physically for questions so that researchers can receive the input of the group. Finding the right people with the right characteristics for the group can also be cumbersome and requires screening group members to identify the right people to carry out the study. The current process of obtaining data from focus groups is expensive, slow and cumbersome and requires users to travel and meet physically.

BRIEF SUMMARY

What is needed in the art related to conducting focus groups is a new tool or framework for screening and assembling a focus group quickly, on-line and essentially on-demand. Often a company may desire data from a focus group the same day so that they can respond in a quick and efficient manner. There is currently no mechanism to be able to properly organize and carry out a focus group in such a short amount of time.

The tool disclosed herein addresses this deficiency by providing a workflow that organizes and manages the various events that need to occur to enable a client who requested a focus group to be able to participate in the process of selecting and organizing the focus group in a very short amount of time. The tool should enable a client or a moderator to review demographics and other critical data or responses in real time to enable the quick identification of potential members of the focus group. The moderator can be a person who works for a company that manages the focus group process. The tool then can establish a waiting room in which the moderator can pre-screen the potential focus group members via video conferencing calls. The tool can automatically generate video conferencing sessions and schedule individual potential focus group members so that the moderator and/or client can view each potential member and test their technical capabilities. Once the final focus group members are chosen, the tool can automatically generate a video conference to actually carry out the focus group to receive the group input. The client that requested the focus group can participate in the group discussion and quickly receive the output data and results of the study all through the same tool.

Many focus groups are held in person but given issues that can arise with respect to travel, health and gathering in large groups due to health issues associated with a pandemic such as the current COVID-19 pandemic, focus groups are moving more towards video conferencing.

In one example scenario, a client requests a focus group with its specific parameters and desires to have the focus group convened that day. In order to achieve such a quick result, multiple video conferences need to occur prior to an actual focus group video conference. A moderator needs to communicate with the client. A pool of potential focus group members needs to be identified and screened in some manner to determine the final group of focus group members. The moderator can carry out video conferences to screen individual potential focus group members prior to holding the actual focus group. The actual focus group video conference also needs to occur. Different user interfaces can be presented for each different type of video conference. The tool disclosed herein represents a focus group management module which can operate on a computer system in order to manage the flow of steps that are useful in order to quickly organize, screen and carry out the focus group.

An example method includes receiving, at a network server, a request from a first user for a focus group, presenting, via the network server, a group of screened and qualified potential focus group participants, and receiving, via the network server, a selection of a subgroup of participants from the group of screened and qualified potential focus group participants, the selection performed by at least one of a selection algorithm, the first user or a second user and placing each participant in the subgroup of participants in a waiting room environment prior to establishing the focus group.

The method can further include establishing a respective test video conference between each participant in the subgroup of participants in the waiting room environment and the second user, confirming, via the network server and based on the respective test video conference, a respective technical ability to carry out a video conference at a respective location for a respective participant from the subgroup of participants to yield a respective confirmed participant, and establishing the video conference comprising each respective confirmed participant as the focus group and the second user.

Once the focus group video conference has started, the method can include receiving respective data as part of the focus group from each respective confirmed participant on the video conference and presenting, via the network server, live data associated with the video conference of the focus group to the first user at a user device on an individual basis of one member of the focus group, a segmented basis of the focus group or a focus group basis. For example, data broken down by age, race, income, gender and so forth can be segmented for the client and communicated to the client device. The focus group management module can configure different user interfaces and establish different video conferencing sessions with different user devices depending on the different phases of the focus group development process.

In another example, an embodiment can include a network server that includes a focus group management module programmed to cause the network server to perform operations including receiving a request from a first user for a focus group, presenting a group of screened and qualified potential focus group participants, and receiving a selection of a subgroup of participants from the group of screened and qualified potential focus group participants, the selection performed by at least one of a selection algorithm, the first user or a second user and placing each participant in the subgroup of participants in a waiting room environment prior to establishing the focus group.

The operations performed by the focus group management module can further include establishing a respective test video conference between each participant in the subgroup of participants in the waiting room environment and the second user, confirming, based on the respective test video conference, a respective technical ability to carry out a video conference at a respective location for a respective participant from the subgroup of participants to yield a respective confirmed participant and establishing the video conference including each respective confirmed participant as the focus group and the second user.

Once the video conference has started, the focus group management module can further perform operations including receiving respective data as part of the focus group from each respective confirmed participant on the video conference and presenting live data associated with the video conference of the focus group to the first user at a user device on an individual basis of one member of the focus group, a segmented basis of the focus group or a focus group basis.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the various advantages and features of the disclosure can be obtained, a more particular description of the principles described above will be rendered by reference to specific embodiments thereof, which are illustrated in the appended drawings. Understanding that these drawings depict only example embodiments of the disclosure and are not to be considered to limit its scope, the principles herein are described and explained with additional specificity and detail through the use of the drawings in which:

FIG. 2 illustrates a user interface and focus group characteristics;

FIG. 3 illustrates an example list of potential focus group members and their characteristics;

FIG. 4 illustrates a user interface of a live group of potential group members selected for the focus group;

DETAILED DESCRIPTION

Figure 1:
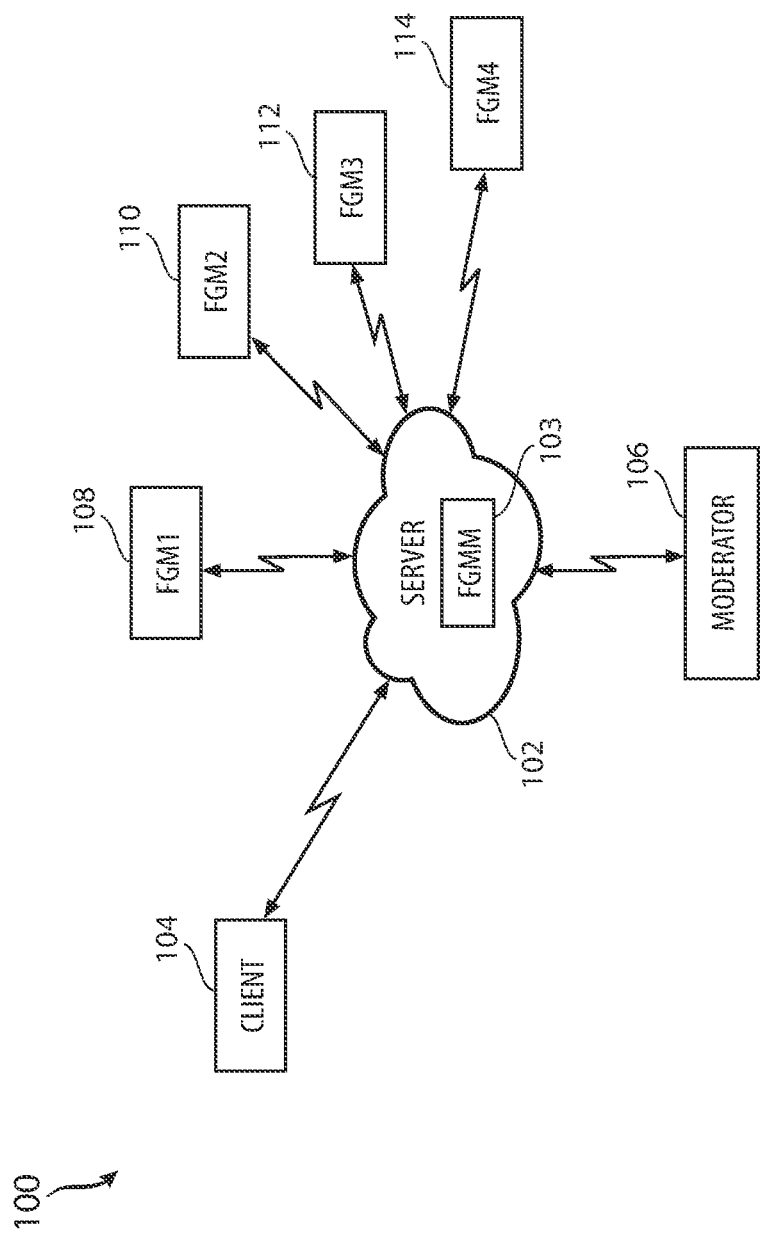
FIG. 1 illustrates an example system for providing a new technical environment to achieve focus group data.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. Any component or concept in one figure or one embodiment can be used in another figure or embodiment. It should be understood that various changes may be made in the function and arrangement of elements without departing from the spirit and scope of the application as set forth in the appended claims.

Disclosed herein is an improvement to focus group technology that enables users to easily participate in the entire process of gathering and holding a focus group no matter what the role of the individual. Typically, there are four roles in the process that can be managed by the focus group management module technology. First, a client requests a focus group. Second, a moderator works with the focus group management company throughout the process. Third, there are potential members of the focus group that are chosen and screened, and fourth, the confirmed members of the focus group. The focus group management module technology manages the communication, user interfaces, timing of communications, and so forth for each of these different groups of people. Other groups can be added as well. An example system 100 shown in FIG. 1 can include several components. A network-based server 102 can include the primary programming and program modules which are utilized to perform various operations such as presenting user interfaces, establishing videoconferencing connections between various individuals associated with a focus group, receiving and performing data analysis and presentation, presenting the proper user interface depending on the type of video conference or other communication that is occurring, managing groups of individuals as the process progresses from a request for a focus group and actually carrying out the focus group, and so forth.

In one aspect, the system covers the server 102 with its associated functionality. A focus group management module (FGMM) 103 provides the functionality disclosed herein and renders the server 102 as a special purpose or special function computing device 102. The functions are not merely mathematical algorithms operating on the server 102 but involve performing a series of operations in a particular order including establishing video conferences and user interfaces that are tailored for different groups of people in the process. The operations can include establishing videoconferencing sessions with different entities, generating and presenting different user interfaces in connection with respective videoconferencing sessions and receiving data and recording or storing data associated with some of the videoconferencing sessions. The overall process begins with the request for a focus group and involves a detailed management of the process of identifying potential members of the focus group, screening for the final focus group members, enabling the client who requested the focus group to participate in and select focus group members or potential members to the further screened, and/or carrying of the focus group, and reporting the results to the client. The timing element also is a part of this disclosure as the process is designed to be achieved in a short amount of time such as, for example, 10 hours or less or 5 hours or less. Other time frames are also considered such as a one or two day time frame. However, using the focus group management module as disclosed herein can enable shorter times between the request for a focus group and actually convening and carrying out the focus group.

In another aspect, the system can include the server 102 and one or more additional devices 104, 106, 108, 110, 112, 114 that each communicate with the server 102. The particular mode of communication can include a wired communication, wireless protocol (5G, LTE, WiFi, etc.), satellite communication, or any other communication protocol in whole or in part between the respective device 104, 106, 108, 110, 112, 114 and the network-based server 102. Any one or more of the devices 104, 106, 108, 110, 112, 114 can include additional hardware components such as microphones and video cameras used for carrying out video conferences.

A client device 104 can be used by an entity that requests a focus group to be performed. One of the aspects of this disclosure is to provide new tools and functionality to enable a quick organization and implementation of the focus group. For example, assume that an entity desires to obtain feedback from the focus group in connection with a golf tournament that is occurring the next day. The entity might be running the tournament, advertising for the tournament, or in some way connected with an event. One challenge in the existing state of the art would be that if such an entity desired solid focus group data in a short amount of time (say on the same day), it would be virtually impossible to identify members having the proper characteristics for the focus group, organize the focus group, getting the members of the focus group to attend, receive and analyze their feedback, and report back to the client. The new tools and functionality disclosed herein resolve these technical issues and enable a substantive and properly configured focus group to be identified and convened all within the same day, including with participating from the client who requested the focus group.

FIG. 1 discloses a moderator device 106 which can be a device operated by an organization or moderator that manages the focus group. The client using the client device 104 can submit a request for a focus group to the network-based server 102 and the moderator device 106 can be related to or be associated with the person working with the moderator that manages the focus group. In one aspect, the network-based server 102 includes the focus group management module 103 that includes the various components and programming to present the proper user interface to the proper recipients, to establish the proper video conferencing session to the proper individuals (with the properly tailored user interfaces), and to receive data from the proper individuals. The different parties have different roles in carrying out a focus group as described herein. The client requests the focus group, the moderator manages and runs the focus group, and focus group members participate in the focus group to provide their input and opinions. Each of these respective individuals need to have at least one (and most likely more than one) video conferencing session throughout the process, and the proper user interface presented to them in an easy and efficient manner particularly. One video conferencing context is where the client may want to assist in identifying the proper individuals to participate in the focus group all within a very short amount of time. At some point, individual potential members of the focus group will need to have a video conference with the moderator in order to confirm their technical capabilities and to confirm that a respective potential member of the group should be promoted to actually participate in the focus group.

Ultimately, focus group members have focus group member devices 108, 110, 112, 114 and will each participate in a focus group as described herein. Each of the devices 108, 110, 112, 114 will typically represent and include the necessary hardware components to enable a video conference to occur. For example, each device 108, 110, 112, 114 can include a video camera, a microphone, and components capable of establishing a communication over a network such as the Internet to the network-based server 102. One of skill in the art will understand these basic components that would be needed. Part of the process disclosed herein is a new functional set of tools that enables a moderator or user operating the moderator device 106 to be able to interview, via a video conference, respective potential focus group members using their technology prior to actually carrying out the focus group in order to confirm that a respective focus group member has the proper capabilities in their respective device 108, 110, 112, 114.

The example set forth above related to a desire of a client to carry out a focus group related to a golf tournament that can include the following operations. First, once the focus group company receives the request for the focus group, the focus group company can transmit, itself or through partner organizations, a request to a group of individuals who are either preregistered or might be willing to participate in the focus group. For example, a request can be transmitted to a thousand people to take part in the survey related to their interest level associated with golf. The request can offer them a benefit such as a certain amount of money to take the survey. The request can also include a note that if they are chosen for a particular focus group, they may receive an additional benefit such as a higher amount of money which can be, for example, $75 or $100.

Assume in this example that 800 people of the 1000 people take the survey to provide information about themselves and their interest in golf. FIG. 2 illustrates an example interface 200 which provides data regarding those who are becoming prequalified to participate in the focus group. For example, interface 200 can be presented on a moderator device 106 and/or client device 104 after the initiation of the process. Data such as one or more of genders 202, age ranges 204, ethnicity 206, education level 208, and household income 210 can be provided. Ratings such as shown by feature 212, 214, 216, 218 can identify various people that are responding in real-time to the survey. A user can receive an email with a user interface generated by the focus group management module 103 or from another company or entity that has access to the pool of people who might be participants in the focus group.

An elapsed time since the initiation of the survey can be presented in this user interface 200 as well. Assume that the system transmits the request at 1:00 PM on a Tuesday. The goal and the benefit of the tool disclosed herein is that the actual focus group can be scheduled to actually occur very soon after the initial transmission of the request for participants. For example, the focus group could be scheduled at 2:00 PM, 4:00 PM, or 6:00 PM that same day. Users that might have the ability to participate in the focus group and thus make the money can pursue the project and participate in the survey to draw out their interest in the topic.

FIG. 3 illustrates an example user interface 300 which presents real-time data of people who have taken the survey and provided information about their interest in golf. This interface can dynamically be changing. The user interface 300 is generated and managed by the focus group management module 103 on the network-based server 102. Note the left column in which a time 318 is shown for when the data was received in connection with each respective individual. This data relates to the specific topic of golf. Data such as one or more of gender 302, age 304, ethnicity 306, education 308, household income 310, whether they follow men's golf majors 312, whether they have been to a PGA (Professional Golf Association) Tour 314, and other actions taken related to golf 316 can be provided. One benefit of presenting on a user interface 300 dynamic data regarding the larger pool of individuals which could ultimately participate in a focus group is that the user of the moderator device 106 or user of a client device 104 can both be on a video conference communication and view the same data and talk over the data to make selections of who should be retained and who should be eliminated from the pool of people for the focus group.

In this regard, in the phase of the focus group process in which a selection is made of potential focus group members, the focus group management module automatically generates a shared user interface as is shown in FIG. 3 and presents it in a video conference session with the moderator and the client on their respective devices.

The user interface represents a modification of a standard video conferencing interface such that additional functionality is added to enable both the client on client device 104 and the moderator on moderator device 106 to be able to interact with the user interface and make selections of potential members of the focus group. Typically, one user can simply share their screen for other users of a video conference to be able to view the content. In contrast, the user interface that is presented to at least two individuals in this video conference can include the capability of both users being able to make selections of members of the pool of individuals such that the focus group can be established. This is an optional feature and not required however as in one aspect the moderator can physically make the selection of potential focus group members as instructed in the video conference by the client.

As individuals from the pool of 1000 people take the survey, and the basic data identified above is retrieved, their name is added to the queue shown in the user interface 300. The next figure illustrates how the client and the moderator can jointly view the queue of individuals and make decisions regarding which individuals should be allowed to take the next step and be personally screened in preparation for the focus group.

FIG. 4 illustrates a user interface 400 with some individuals having been chosen to be further screened in preparation for the focus group. The focus group management module 103 can implement a video conference between the client device 104 and the moderator device 106 and present the user interface 400 for interaction and data. In one example, a group of individuals 428 can be selected for participation via a user interaction button 430 which enable any of the users (typically the client and/or the moderator) to add or delete potential focus group members. The software management module 103 will initiate, schedule, and carry out the video conference presenting the user interface 400 to one or more individuals.

In one aspect, the moderator may just choose the potential participants in the focus group from the pool of individuals shown in the user interface 400. However, as noted above, in an effort to speed up this process, and to enable the client to quickly and easily participate in the process of formulating the appropriate characteristics of a focus group, the focus group management module 103 can initiate a video conference and coordinate the presentation of the user interface 400 with specific functionality to enable the client to make selections of individuals as well as the moderator. The construction of the user interface can include a video feed of the client and the moderator in connection with the automatic presentation of the user interface 400 which they can view and interact with together in order to choose potential members of the focus group. The advantage of this approach is that it keeps the client involved in the process which needs to occur very quickly and allows them to also personally choose the characteristics of individuals that can be part of the focus group.

In another aspect, the user interface 400 can also be modified in the following manner. Assume that as part of the survey, the system 102 requests a brief video of the individual who potentially might be participating in the survey. For example, the survey that is presented to a respective participant can be configured to enable the user to click on a start button which would begin a recording session in which, for example, questions could be presented on a screen of the computer of the respective potential participant, a video recording using the potential participants device video capabilities and audio capabilities can be turned on, and the user might be able to simply respond to several questions in a short video session. This video session can be then attached to a respective listing in the user interface 400 such that the moderator and/or the client, if they are interested in the data for a respective potential focus group member, can click on the brief video conference that is recorded for that individual. The client or the moderator see the individual briefly and further make a more intelligent decision regarding whether they want that individual to participate in the focus group or not. Such a process can be a proxy if necessary for a personal interview with the moderator prior to carrying out the focus group. In another aspect, such an approach could also provide data regarding the technical capabilities of the device associated with each potential focus group member 108, 110, 112, 114.

Region 426 of the user interface 400 can represent dynamically added names to the potential focus group members. Data such as one or more of a heading of prequalified, qualified, and rejected 402 can be used, a first name 404, last name 406, gender 408, age 410, ethnicity 412, education 414, household income 416, interest in men's majors 418, experience with the PGA Tour 420, actions associated with golf 422, and contact information 424 can be provided as well. As noted above, data can be attached to each individual such as a video recorded of them answering questions or other documents which can be available to the client and/or the moderator in preparation for the focus group.

In one aspect, the focus group management module 103 provided on the network server 102 can be configured to enable a user of the moderator device 106 to easily establish a video conference call with the client on the client device 104 and dynamically and simultaneously view the user interface 400 like that shown in FIG. 4. Potential focus group members dynamically enter the queue shown in the user interface 400 by having completed the survey. The user interface 400 can enable simultaneous selection via buttons 430 from either the user of the client device 104 or the moderator device 106. In this manner, both users can simultaneously discuss and select the individuals who ultimately will be in the focus group. One benefit of using a video conference between the client and the moderator is that the moderator, as an experienced individual involved in developing and carrying out focus groups, can discuss potential focus group members with the client and help make a decision regarding who the client desires in the focus group.

In one example, assume that the focus group in this golf example is to be between 10 and 20 people and it is desirable to have a mix of different ethnicities, genders as well as a mix of education and household income. The client using the client device 104 can tailor the individuals within the focus group by reviewing the names and their associated data as they come into the queue shown in user interface 400. Thus, the selection of members of the focus group can be manually performed by one or more of the users described above.

In another example, the client requesting the focus group can provide a desired configuration of the focus group through a user interface. For example, the client can use client device 104 to select parameters such as age, gender, a percentage of a particular parameter of the focus group, such as 50% of individuals with incomes above $100,000 and 50% of the individuals should have an income below $100,000. Such parameters can be established and a selection algorithm can be applied to the potential members of the focus group that enter the queue shown in the user interface 400.

In as much as the queue in user interface 400 is dynamic and the time frame described herein is short for creating and carrying out the focus group, the application of a selection algorithm can operate in several different ways. For example, once the basic elements of the focus group are achieved with the proper configuration, the selection algorithm can stop operating. In another aspect, merely the selection of the potential group of individuals for the focus group does not ultimately identify the final focus group. This can be because some potential focus group members may not have the necessary equipment such as a video camera or microphone on the respective device or it may be a challenge for a given individual to actually participate in the focus group.

In another example, the selection algorithm may operate as a function of time. For example, if the pool of potential focus group members starts to take the survey at 2:00 PM, and the focus group is to convene at 5:00 PM, the selection algorithm can be programmed to review the queue of incoming individuals that have taken the survey and provided the necessary data and continued to select individuals until a pool of 30 individuals is selected at 4:00 PM. The focus group management module 103 can then start to establish video conferencing sessions with the pool of 30 individuals and the moderator simultaneously or after the group of individuals is selected. The moderator can then carry out video conferencing screening sessions with the pool of individuals and confirm some individuals for the actual focus group and reject others. If the final focus group number should be 15, then the focus group management module 103 can continue to monitor the chosen members of the actual focus group. If 15 members are chosen, then the selection algorithm can finish its process. However, if the moderator rejects, for example, 20 of the 30 individuals, the focus group management module 103 can in real time identify and track the selections made by the moderator and restart the selection algorithm to continue to add to the pool of individuals which need to be prescreened in order to arrive at the final number of 15 members the focus group. These operations can be valuable in the context of the ability to manage the development and creation of the focus group using only a single moderator who has responsibilities to interview individual potential focus group members and manage the entire process. The focus group management module 103 can perform some of these processes and enable the moderator to handle the more manual tasks of personally interviewing or prescreening the pool of potential members for the focus group.

Thus, the selection of individuals for the focus group shown in FIG. 4 still remains a pre-selection. The focus group management module 103 operating on the network server 102 also enables the moderator operating the moderator device 106 to automatically be able to establish a video conference with respect to potential members of the focus group. These operations can be dynamic and operate concurrently with other operations. For example, the user of the client device 104 might continue to view the user interface 400 and select potential members of the focus group. At the same time, those that have been selected to potentially be part of the focus group need to be interviewed and their device capabilities confirmed. The moderator operating moderator device 106 can click on or interact with one of the members who have been chosen for the focus group in section 428 and be connected via a videoconferencing service to that particular individual. The focus group management module 103 can automatically schedule, for example, 30 potential focus group members, each for three-minute video conference with the moderator, such that the moderator can simply sit through a series of automatically scheduled interviews and confirm or reject individuals for the focus group. The data associated with each individual can be presented in the user interface to the moderator such that the moderator can easily view and interview each individual, and be presented in the user interface with the option to accept this individual into the focus group or reject the individual. The client using client device 104 can also be granted access to these screening video conferences of potential members of the focus group.

The moderator can then ensure that a respective potential focus group member has the proper equipment and if they are capable of connecting via a video conference capability of their respective devices 108, 110, 120, 114. The moderator operating moderator device 106 might also spend some time interviewing the members of the potential members of the focus group to further decide whether they are capable of participating or will be of benefit to the discussion. Potential focus group members of the rejected at this stage might be paid a partial amount of money for how far they have gone in the process. Potential focus group members that have the proper technology and are accepted by the moderator 106 can be placed into the actual final focus group. Thus, the focus group management module 103 would automatically make a payment to individuals who were rejected for the final focus group and also schedule the accepted members of the focus group for the focus group video conference.

The interviews of the potential focus group members in this process can be occurring right before the time of the focus group. In this aspect, the focus group management module 103 can include dynamic functionality given the short time frame for developing the focus group. For example, the focus group management module 103 can initially establish 30 three-minute interviews with each potential focus group member. The user interface presented to the moderator on moderator device 106 can include a time or a clock which indicates the remaining time for each interview and to keep the moderator on track. In one example, if the actual scheduled time for the focus group is getting closer, the focus group management module 103 could, for example, automatically adjust the prescreening interview time to be 2 minutes for each potential focus group member. The timer can also be adjusted as presented to the moderator and all of the scheduled times for the potential members of the focus group can be adjusted. This dynamic adjustment can ensure that the video conferences occur in preparation for the focus group while at the same time maintaining the scheduled time for the focus group.

In another example, if time is getting short and the number of focus group members is not progressing as expected, a selection algorithm could be initiated and more quickly process users in the queue to select or add to the pool of potential members of the focus group. Thus, if a manual approach to arranging the focus group is taking too long, then an automated approach can be initiated such that one or more of these screening or valuation steps can be implemented to speed up the process. In this regard, the screening and selection process can be a hybrid of a manual approach or an automated approach which can be balanced based on a timing element relative to a scheduled focus group time.

The client using client device 104 can also be included in the video conference screening of potential focus group members as well. Part of the technology disclosed herein is the capability through the focus group management module 103 and interconnection technology to enable the client requesting data from the focus group to be able to participate in or provide input into the entire process of identifying the members of the focus group and actually carrying out the focus group discussion.

In one aspect, individuals who been chosen to potentially be part of the focus group as shown in section 428, are placed into a "waiting room" mode. The waiting room mode can simply be where such a potential focus group member has been notified that they are in a waiting room and that they should expect over the next 10 minutes to have a video conference call with the moderator of the focus group so that there can be a preliminary check on their technical capabilities as well as a preliminary interview of them in preparation for the focus group. The focus group management module 103 operating on the server 102 can maintain and store data regarding each individual and establish different links for creating videoconferencing sessions and calendar schedule invites or otherwise establish videoconferencing sessions as described herein.

For example, Zoom, WebEx, FaceTime, or other videoconferencing capabilities can be utilized to establish a respective video conference. Such capabilities are managed as disclosed herein by a focus group management module 103 which manages the flow of interactions. The operations enable an almost real-time identification of potential focus group members, establishment of a filtering or screening process and ultimately initiation of a group video conference for the focus group.

After the screening and review as described above is achieved, the final listing of focus group members is established. Assume that the screening and review process occurred between say 2 PM and 3:50 PM and that the focus group is scheduled for 4:00 PM. After the final focus group members are identified and established, a group video conference is organized and begun at the appointed time by the focus group management module 103. For example, normally a user manually adds email addresses to a listing of participants in a call and sends out a request or sends out a link to a Zoom video conference. This can be cumbersome to do. In one aspect, the focus group management module 103 as it receives the selection of screened participants for the focus group, will have the email addresses and/or other communication data for each member of the focus group and can generate or establish a video conference session for the proper time and send out calendar invites, emails or other methods of communicating with the final focus group of individuals so that they can participate in the focus group. The focus group management module 103 can, for example, manage calendar invites with the video conference data and manage the receipt of "acceptances" from the individual members. In one aspect, the focus group management module 103 can integrate with a Zoom service at zoom.us or a WebEx service such that the establishment of video conferences as described herein can be easily integrated into such services. In some cases, additional functionality can be added as noted herein, such as the ability to enable two users to both interact with and make selection choices on a shared user interface, rather than one user merely sharing a screen with another user.

The configuration of the focus group video conference can vary. In one aspect, each member of the focus group participates in a normal WebEx or Zoom videoconferencing environment. However, the client who requested the focus group may or may not want to be seen or participate in the focus group. The client may not want to bias the experience of the members of the focus group and may be only limited to listening or viewing the focus group. The level of participation of the client can vary and can be selectable by the client from the client device 104.

In another example, the focus group management module 103 can modify the respective user interfaces such that each member of the focus group 108, 110, 112, 114 can receive data regarding the subject matter of the focus group. For example, the server 102 might present a video, or an additional survey, where a user interface that each member of the focus group could interact with is presented as part of the focus group. In another aspect, the system may utilize feedback tools such as automatic speech recognition, voice recognition, gesture recognition, multimodal input recognition, infrared analysis, audio analysis, and so forth in order to evaluate and interpret various user interactions from the focus group. In one aspect, the focus group sessions are recorded and can be transcribed and made available to the client at their client device 104 after the conclusion of the focus group.

Figure 5:
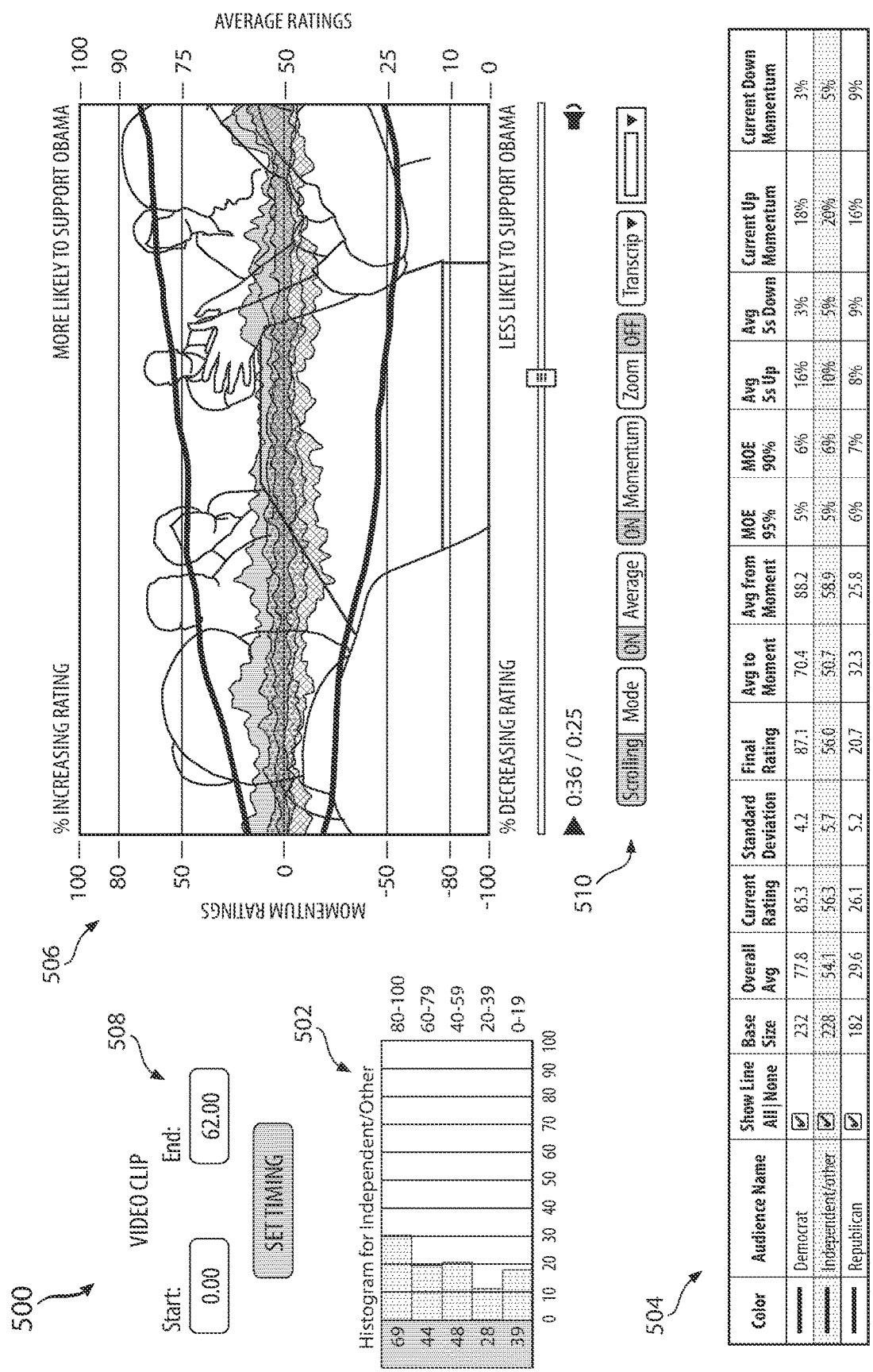
FIG. 5 illustrates an example user interface which provides data about the focus group.

FIG. 5 illustrates an example user interface 500 which can represent data gleaned from the focus group either dynamically in real-time or as a report at the conclusion of the focus group. The topic of this data shown in user interface 500 is political. For example, feature 502 represents a histogram for independent voters or others which can identify data such as how many people and each agent group are likely to vote for a particular candidate. Feature 504 represents further data about members of the focus group which can include such information as political affiliation, the size of the focus group, various ratings and standard deviation data, and so forth. Options 510 can be presented which can adjust the type of presentation of the data and image 506 can present an overlay of, for example, a commercial with data regarding different types of individuals such as Democrats or Republicans in their input with respect to whether they are more likely to support a political candidate or less likely to support a particular political candidate along a time line of the commercial that they are viewing. Feature 508 represents a timing component associated with the survey group.

FIG. 5 provides a user interface 500 that is exemplary only. The focus group can be crafted for any number of different topics. The subject matter of the user interface 500 in FIG. 5 is a political topic. If the topic were related to golf, the data and structure can be configured differently based on how the focus group is carried out.

Figure 6:
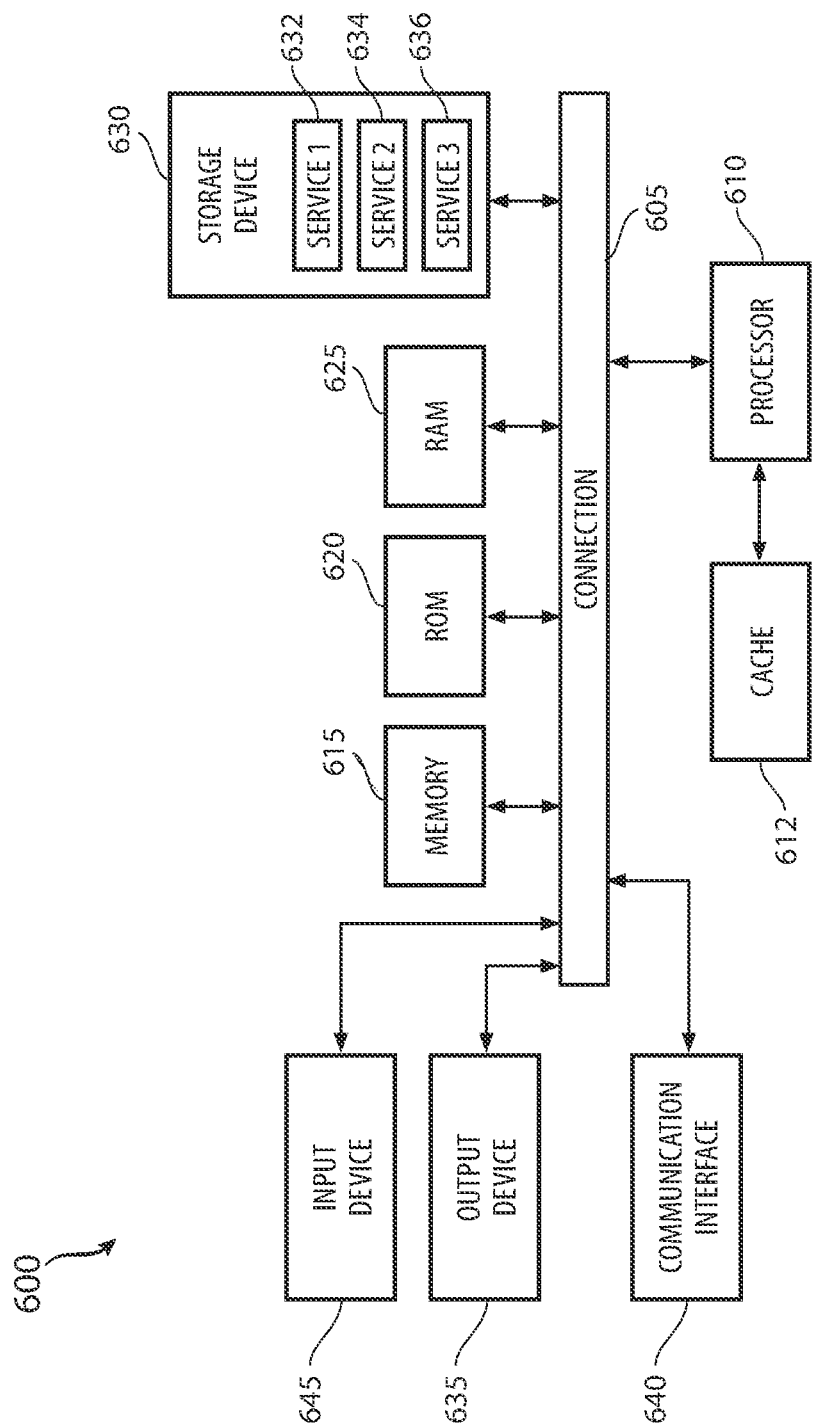
FIG. 6 illustrates an example system.

FIG. 6 illustrates an example computing system architecture of a system 600 which can be used to process data operations and requests, store data content and/or metadata, and perform other computing operations. In this example, the components of the system 600 are in electrical communication with each other using a connection 605, such as a bus. The system 600 includes a processing unit (CPU or processor) 610 and a connection 605 that couples various system components including a memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to cache 612 for quick access by the processor 610. In this way, the cache can provide a performance boost that avoids processor 610 delays while waiting for data. These and other modules can control or be configured to control the processor 610 to perform various actions. Other memory 615 may be available for use as well. The memory 615 can include multiple different types of memory with different performance characteristics. The processor 610 can include any general purpose processor and a hardware or software service, such as service 1 632, service 2 634, and service 3 636 stored in storage device 630, configured to control the processor 610 as well as a special-purpose processor where software instructions are incorporated into the actual processor design. The processor 610 may be a completely self-contained computing system, containing multiple cores or processors, a bus, memory controller, cache, etc. A multi-core processor may be symmetric or asymmetric.

To enable user interaction with the computing system 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing system 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof. The computer-readable medium may include memory or data storage media, such as non-volatile random access memory (NVRAM), electrically erasable programmable read-only memory (EEPROM), FLASH memory, magnetic or optical data storage media, and the like.

The storage device 630 can include services 632, 634, 636 for controlling the processor 610. Other hardware or software modules are contemplated. The storage device 630 can be connected to the connection 605. In one aspect, a hardware module that performs a particular function can include the software component stored in a computer-readable medium in connection with the necessary hardware components, such as the processor 610, connection 605, output device 635, and so forth, to carry out the function.

For clarity of explanation, in some instances the present technology may be presented as including individual functional blocks including functional blocks including devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. A computer system programmed with the algorithms disclosed herein or incorporated herein by reference are a special-purpose computer system according to Patent Office Guidance. The computer executable instructions may be, for example, binaries, intermediate format instructions such as assembly language, firmware, or source code.

Figure 7:
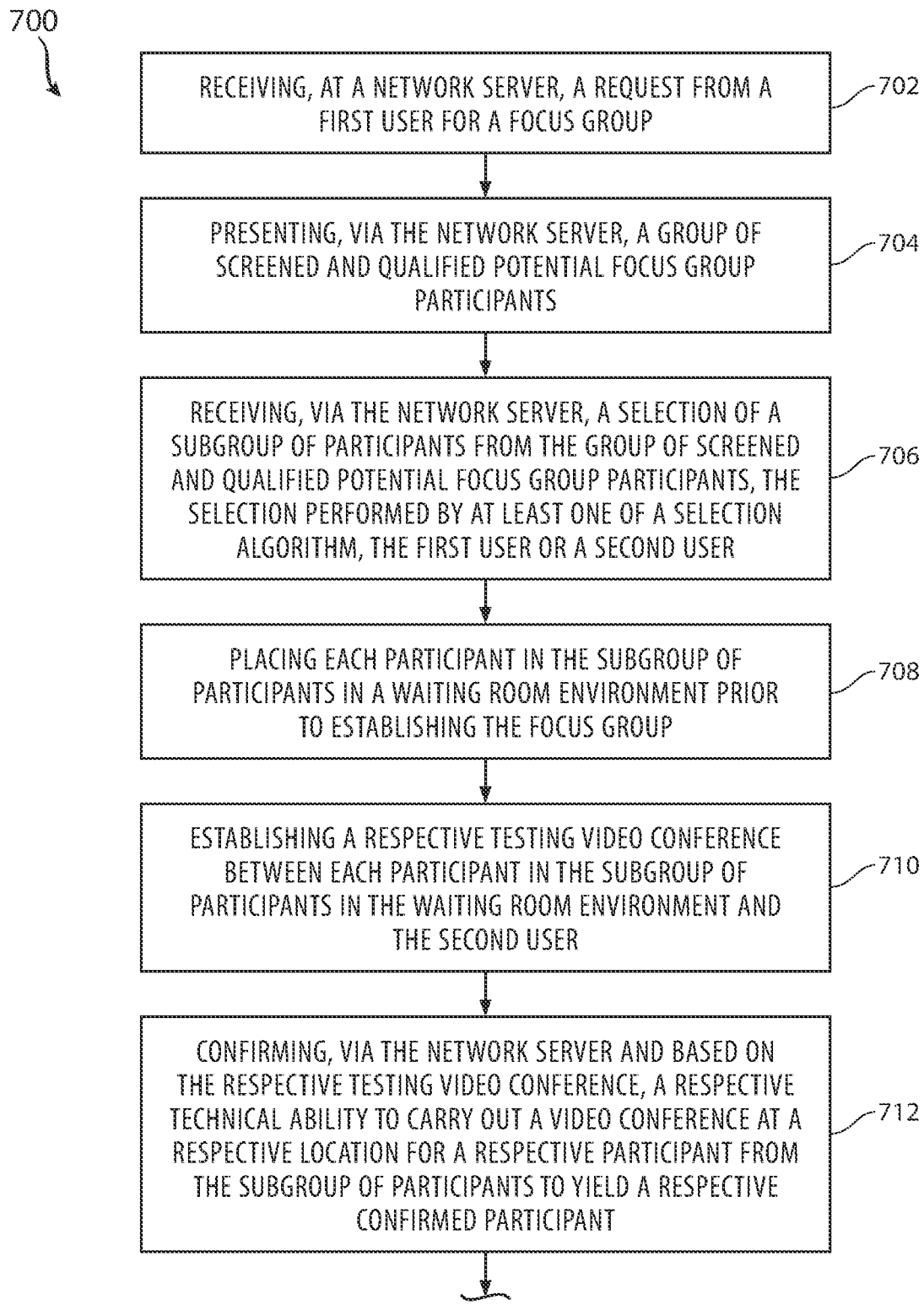
FIG. 7 illustrates an example method.
Figure 7:
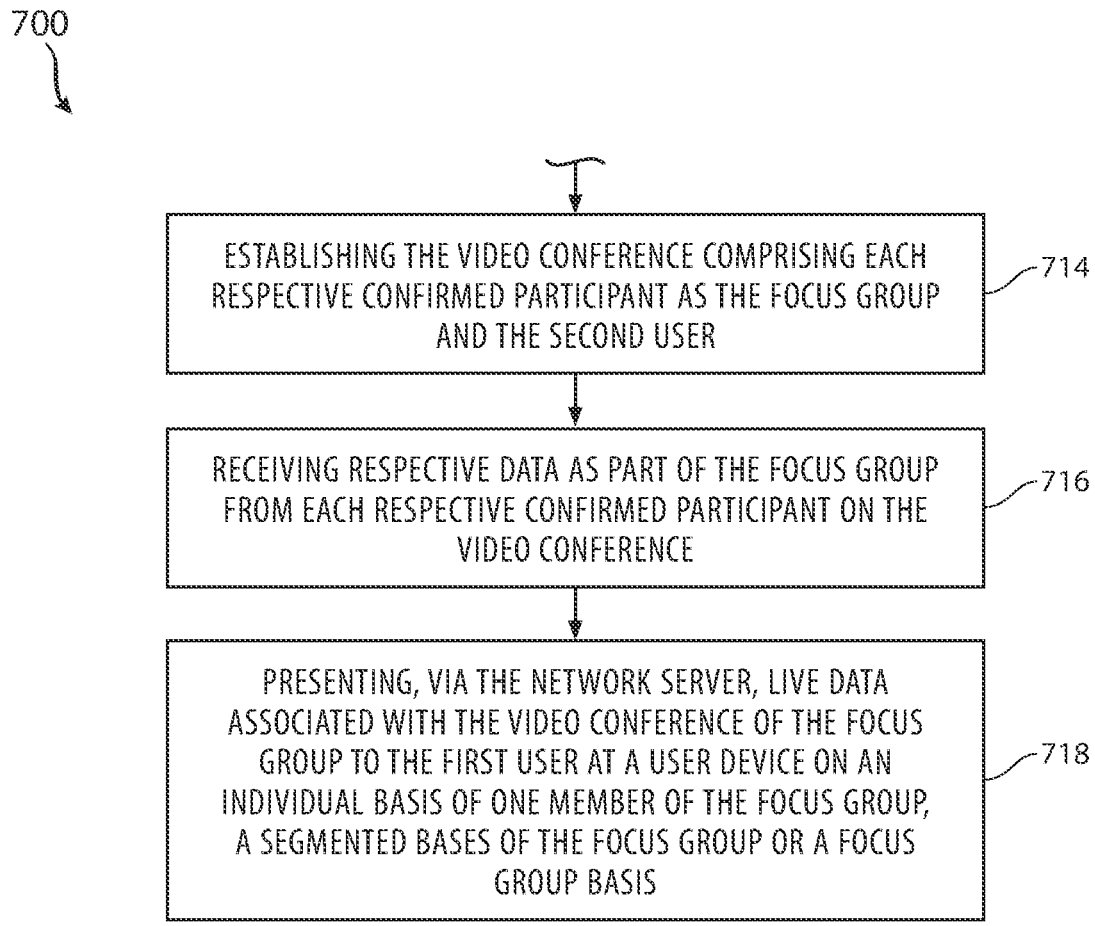

An example method is shown in FIG. 7. A method 700 can include receiving, at a network server, a request from a first user for a focus group (702), presenting, via the network server, a group of screened and qualified potential focus group participants (704), receiving, via the network server, a selection of a subgroup of participants from the group of screened and qualified potential focus group participants, the selection performed by at least one of a selection algorithm, the first user or a second user (706) and placing each participant in the subgroup of participants in a waiting room environment prior to establishing the focus group (708). The waiting room environment can be like a holding place where potential group members can wait to be interviewed so that the user can test their equipment and confirm that they would be an active and participating member of the focus group.

The method can further include establishing a respective testing video conference between each participant in the subgroup of participants in the waiting room environment and the second user (710) and confirming, via the network server and based on the respective testing video conference, a respective technical ability to carry out a video conference at a respective location for a respective participant from the subgroup of participants to yield a respective confirmed participant (712). The method can include establishing the video conference comprising each respective confirmed participant as the focus group and the second user (714), receiving respective data as part of the focus group from each respective confirmed participant on the video conference (716) and presenting, via the network server, live data associated with the video conference of the focus group to the first user at a user device on an individual basis of one member of the focus group, a segmented basis of the focus group or a focus group basis (718).

The live data can include real-time results during the video conference of the focus group. The results can be obtained through user input, facial recognition, speech processing, multimodal input, infrared analysis, or any combination of one or more different types of input from participants in the focus group. The waiting room environment can at least establish a screening video conference with each potential participant in the waiting room environment to determine the respective confirmed recipient. In one aspect, the selection algorithm includes parameters established by the first user. Thus, when the selection algorithm is used, the network server 102 can automate the selection of the potential members of the focus group which can then be put into a queue or waiting room environment for further screening prior to actually entering the focus group.

The selection of a subgroup of participants can be performed by the selection algorithm. The selection algorithm in this scenario selects each participant in the subgroup of participants based on parameters which can include one or more of a gender, an income level, an interest, an age, a geographic location, an education level, an ethnicity, historical actions, and a group demographic definition. The selection algorithm may even be able to play and analyze recorded brief video interviews of prospective focus group members. For example, as has been noted above, one aspect of the survey could be to take a brief video interview of each prospective focus group member. Once they make it into a queue of potential members, a selection algorithm could evaluate the raw data identified above but also process a brief video of the potential focus group member for such information as speech characteristics, volume, how talkative the individual is (how did they answer a specific question, with a yes or no or with a longer explanation), body movements or gestures provided by the individual, and so forth. An audio and/or video evaluation of the person can be performed which can further be used as part of a screening process to determine whether that person should be included within the focus group. In another example, such a process can be used as a first layer of screening and a second layer of screening can involve the focus group management module 103 automatically scheduling a subgroup of potential participants for a personal interview via a video conference by the moderator and/or the client.

In one aspect, the group of screened and qualified potential focus group participants can be updated in real-time during the selection of the subgroup of participants. The selection of the subgroup of participants can be performed at least in part by the second user and as part of a selection video conference between the first user and a second user in which a display of the group of screened and qualified potential focus group participants is presented.

The method can further include, after receiving the request for the focus group, transmitting an offer to participate in the focus group to a larger group of potential participants. Such an offer can require each member of the larger group of potential participants to take a survey and receive a reward if a respective person is selected for the focus group and the offer comprising a timeframe of when the focus group is starting.

As noted above, typically the timeframe between the time of a request for a focus group survey and the actual carrying out of the survey is shortened. For example, the timeframe can be 10 hours or less, or 5 hours or less. Of course this time is variable and could be longer or shorter. However, where issues arise and immediate feedback is desired, the client can request a focus group and have it prepared, configured, and carried out all within a very short amount of time.

The video conference can include the first user or the client who requests the focus group. The video conference can be configured however such that the first user participates in a partial mode or a full mode. Typically, the second user of the moderator device 106 will fully participate in carrying out the survey and talking to the various members of the focus group. The level of participation of the first user can vary or be dynamic throughout the focus group. For example, if there are 5 issues to be discussed by the focus group, and issue number 3 is not agreed upon or there is much conflict in the focus group regarding an answer to a particular issue, then the network server 102 can be configured to enable the first user, who could be monitoring live data from the focus group, to decide to join the focus group via audio and/or video and ask further questions or participate fully in the focus group.

In another example, an embodiment can include a network server that includes a focus group management module 103 programmed to cause the network server 102 to perform operations including receiving, at a network server 102, a request from a first user for a focus group, presenting, via the network server 102, a group of screened and qualified potential focus group participants, receiving, via the network server 102, a selection of a subgroup of participants from the group of screened and qualified potential focus group participants, the selection performed by at least one of a selection algorithm, the first user or a second user and placing each participant in the subgroup of participants in a waiting room environment prior to establishing the focus group.

The operations performed by the focus group management module can further include establishing a respective testing video conference between each participant in the subgroup of participants in the waiting room environment and the second user, confirming, via the network server and based on the respective testing video conference, a respective technical ability to carry out a video conference at a respective location for a respective participant from the subgroup of participants to yield a respective confirmed participant and establishing the video conference comprising each respective confirmed participant as the focus group and the second user. The operations can further include receiving respective data as part of the focus group from each respective confirmed participant on the video conference and presenting, via the network server 102, live data associated with the video conference of the focus group to the first user at a user device on an individual basis of one member of the focus group, a segmented basis of the focus group or a focus group basis.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. A device can include a computing device, a display, a microphone, and a video camera to carry out the video conferencing features described herein. As such, the device(s), when including these specific input/output components, are not generic computer processors but more specific hardware devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A method comprising:
receiving, at a network server, a request from a first user device for a focus group associated with a topic, wherein a first user associated with the first user device is not part of the focus group and wherein at a time of receiving the request, the focus group has not been formed and wherein when the focus group is formed, all participants in the focus group join together to form the focus group;
presenting, via the network server and after the time of receiving the request, a group of screened and qualified potential focus group participants;
receiving, via the network server and prior to establishing the focus group, a selection of a subgroup of participants from the group of screened and qualified potential focus group participants, and the selection of a subgroup of participants from the group of screened and qualified potential focus group participants comprising the focus group, the selection performed by at least one of a selection algorithm, the first user or a second user;
placing each participant in the subgroup of participants in a waiting room environment prior to establishing the focus group;
establishing a respective testing video conference between each participant in the subgroup of participants in the waiting room environment and the second user;
confirming, via the network server, a respective technical ability to carry out a video conference at a respective location for a respective participant from the subgroup of participants to yield a respective confirmed participant;
establishing the video conference comprising each respective confirmed participant as the focus group and the second user;
receiving respective data as part of the focus group from each respective confirmed participant on the video conference;
running, via the network server and based on the selection of the subgroup of participants from the group of screened and qualified potential focus group participants, the focus group, wherein each participant of the subgroup of participants in the focus group uses a respective participant device to communicate with the network server in order to run the focus group; and
presenting live data associated with the video conference of the focus group to the first user at a user device on one or more of an individual basis of one member of the focus group, a segmented basis of the focus group or a focus group basis.

2. The method of claim 1, wherein the live data comprises real-time results during the video conference of the focus group.

3. The method of claim 1, wherein the waiting room environment comprises at least establishing a screening video conference with each potential participant in the waiting room environment to determine the respective confirmed participant.

4. The method of claim 1, wherein the selection algorithm comprises parameters established by the first user.

5. The method of claim 1, wherein the selection of a subgroup of participants is performed by the selection algorithm and wherein the selection algorithm selects each participant in the subgroup of participants based on parameters comprising one or more of a gender, an income level, an interest, an age, a geographic location, an education level, an ethnicity, historical actions, and a group demographic definition.

6. The method of claim 1, wherein the group of screened and qualified potential focus group participants is updated in real-time during the selection of the subgroup of participants.

7. The method of claim 1, wherein the selection of the subgroup of participants is performed at least in part by the second user and as part of a selection video conference between the first user and a second user in which a display of the group of screened and qualified potential focus group participants is presented.

8. The method of claim 1, further comprising, after receiving the request for the focus group:
transmitting an offer to participate in the focus group to a larger group of potential participants, the offer requiring each member of the larger group of potential participants to take a survey and receive a reward if a respective person is selected for the focus group and the offer comprising a timeframe of when the focus group is starting.

9. The method of claim 1, wherein a time between receiving the request for the focus group and having the focus group comprises less than or equal to ten hours.

10. The method of claim 1, wherein a payment is made to each participant in the focus group.

11. The method of claim 1, wherein the video conference further comprises the first user.

12. The method of claim 11, wherein the video conference comprises the first user participating in a partial mode or a full mode.

13. A system comprising:
at least one processor; and
a computer-readable medium storing instructions which, when executed by the at least one processor, cause the at least one processor to perform operations comprising:
receiving a request from a first user device for a focus group associated with a topic, wherein a first user associated with the first user device is not part of the focus group and wherein at a time of receiving the request, the focus group has not been formed and wherein when the focus group is formed, all participants in the focus group join together to form the focus group;
presenting, after the time of receiving the request, a group of screened and qualified potential focus group participants;
receiving, prior to establishing the focus group, a selection of a subgroup of participants from the group of screened and qualified potential focus group participants, the selection performed by at least one of a selection algorithm, the first user or a second user;
placing each participant in the subgroup of participants in a waiting room environment prior to establishing the focus group;
establishing a respective testing video conference between each participant in the subgroup of participants in the waiting room environment and the second user;
confirming a respective technical ability to carry out a video conference at a respective location for a respective participant from the subgroup of participants to yield a respective confirmed participant;
establishing the video conference comprising each respective confirmed participant as the focus group and the second user;
receiving respective data as part of the focus group from each respective confirmed participant on the video conference;
running, based on the selection of the subgroup of participants from the group of screened and qualified potential focus group participants, the focus group, wherein each participant of the subgroup of participants in the focus group uses a respective participant device to communicate with the system in order to run the focus group; and
presenting live data associated with the video conference of the focus group to the first user at a user device on one or more of an individual basis of one member of the focus group, a segmented basis of the focus group or a focus group basis.

14. The system of claim 13, wherein the live data comprises real-time results during the video conference of the focus group.

15. The system of claim 13, wherein the waiting room environment comprises at least establishing a screening video conference with each potential participant in the waiting room environment to determine the respective confirmed participant.

16. The system of claim 13, wherein the selection algorithm comprises parameters established by the first user.

17. The system of claim 13, wherein the selection of a subgroup of participants is performed by the selection algorithm and wherein the selection algorithm selects each participant in the subgroup of participants based on parameters comprising one or more of a gender, an income level, an interest, an age, a geographic location, an education level, an ethnicity, historical actions, and a group demographic definition.

18. The system of claim 13, wherein the group of screened and qualified potential focus group participants is updated in real-time during the selection of the subgroup of participants.

* * * * *